(No Model.)
G. PHILION.
WOOD RIM PULLEY.
No. 429,637. Patented June 10, 1890.
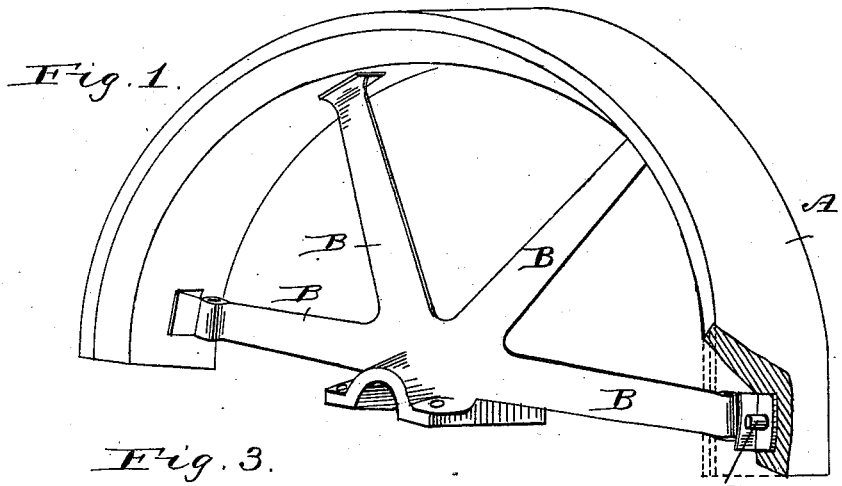
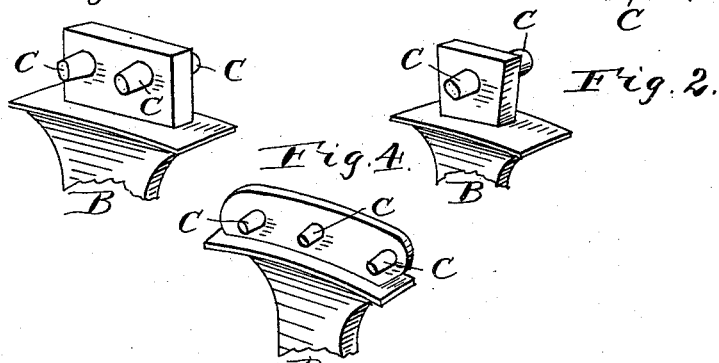
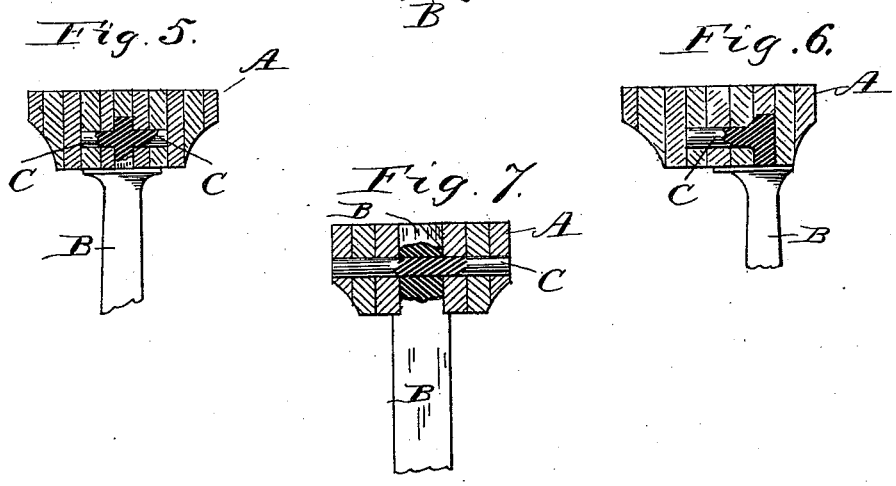
Witnesses:—
Fontaine Maury
E. K. Sturtevant.
Inventor:
George Philion
by Smith & Low
his attys.

UNITED STATES PATENT OFFICE.

GEORGE PHILION, OF MISHAWAKA, INDIANA.

WOOD-RIM PULLEY.

SPECIFICATION forming part of Letters Patent No. 429,637, dated June 10, 1890.

Application filed June 28, 1888. Serial No. 278,499. (No model.)

*To all whom it may concern:*

Be it known that I, GEORGE PHILION, of Mishawaka, in St. Joseph county, in the State of Indiana, have invented new and useful Improvements in Wood-Rim Pulleys; and I do hereby declare that the following is a full and accurate description of the same.

This invention relates to the means for attaching or anchoring the outer extremity of each spoke or arm to the rim of the pulley.

In the patent granted to Dodge and Philion July 4, 1882, numbered 260,462, the end of the spoke entered a notch cut in the rim of the pulley and was fastened there with glue and nails. In the patent granted to Wallace H. Dodge, assignee of Charles McNeal, October 19, 1886, No. 301,064, the arm or spoke was dovetailed at its end and entered a corresponding mortise in the rim. It was solidly fastened there by a wedge and glue. In the patent granted to Wallace H. Dodge August 31, 1886, No. 348,269, the ends of iron spokes are provided with dovetailed or other undercut form of lugs placed transversely across the ends of said spokes. These lugs enter corresponding notches in the rim and are secured there by some solidifying plastic; but it will be observed that in neither one of these does the anchoring member extend laterally into the substance of the rim beyond the lateral side of that part of the arm which enters the rim.

The invention herein described and claimed differs from the above named in the particular alluded to above—*i. e.*, the end of the arm is embedded in the rim and anchored there by a transverse anchor-pin or dowel, which is solidly attached to or integral with the substance of the arm and extends laterally therefrom into the adjacent material of the rim, as clearly shown in the accompanying drawings, wherein—

Figure 1 shows in perspective one-half of a pulley having a wooden rim and metallic arms, the same being partly in section to show the end of the spoke-arm embedded in the substance of the rim. Figs. 2, 3, and 4 represent modified forms of said anchoring portion of the spoke-arm. Figs. 5 and 6 are transverse sections of a wooden rim, showing the metallic arm embedded and anchored therein. Fig. 7 is a transverse section of a wooden rim, showing the end of a wooden arm and transverse rigidly-attached dowel embedded in said rim.

A is the rim of the pulley, built up of circle-segments and firmly united together, as is customary. B B are spokes or arms of wood or metal joined together at a hub in the center of the pulley. At their outer ends the spokes B are embedded in the rim A, which is easily done in the progress of building up said rim out of the circular segments; but the rim may be finished and mortised before the spokes are inserted, if preferred. The proper way, however, is to build the rim to the plane of the spokes and then insert said spokes, completing the rim afterward, and thereby completely embedding the ends of the arms and firmly anchoring them in said rim.

The end of the spoke is anchored by one or more laterally-extended studs or pins C, which are either integral with the substance of the spoke or are solidly and rigidly attached thereto. These studs or pins extend from the side of the spoke into the material of the rim and serve to increase the surface of contact and at the same time render withdrawal impossible. These results are not attained when the spoke is perforated and a bolt or pin is put through said perforation into the rim, because said bolt, not being rigidly attached to the arm, does not extend its surface of contact with the rim. A wooden pin driven tightly into the wooden spoke with glue will be practically homogeneous with said arm and will be rigidly and firmly attached thereto. The lateral extension of the anchoring-pins into the material of the rim where the same is unsevered by the mortise which admits the arm secures an anchorage where the rim is of full strength.

Having described my invention, I claim—

1. The rim A and shouldered arms B, embedded at their ends in said rim, and having the transverse anchoring-pin C rigid with said arms and extended laterally into the material substance of the rim, substantially as set forth.

2. The rim A and arms embedded in said rim, and each arm provided with one or more lateral pins or dowels integral with said arm, as set forth.

3. A pulley having a rim and shouldered arms, the latter embedded at their outer ends in said rim and provided with integral transverse anchoring-pins extended laterally into the material substance of the rim.

4. The rim A and shouldered arms B, embedded at their ends in said rim, and having the integral transverse anchoring-pins C extended laterally into the material substance of the rim.

GEORGE PHILION.

Witnesses:
 WILL W. DODGE,
 D. O. FONDA.